July 20, 1948.  C. CHILOWSKY  2,445,310
MANUFACTURE OF PIEZOELECTRIC ELEMENTS
Filed Jan. 29, 1944  5 Sheets-Sheet 1
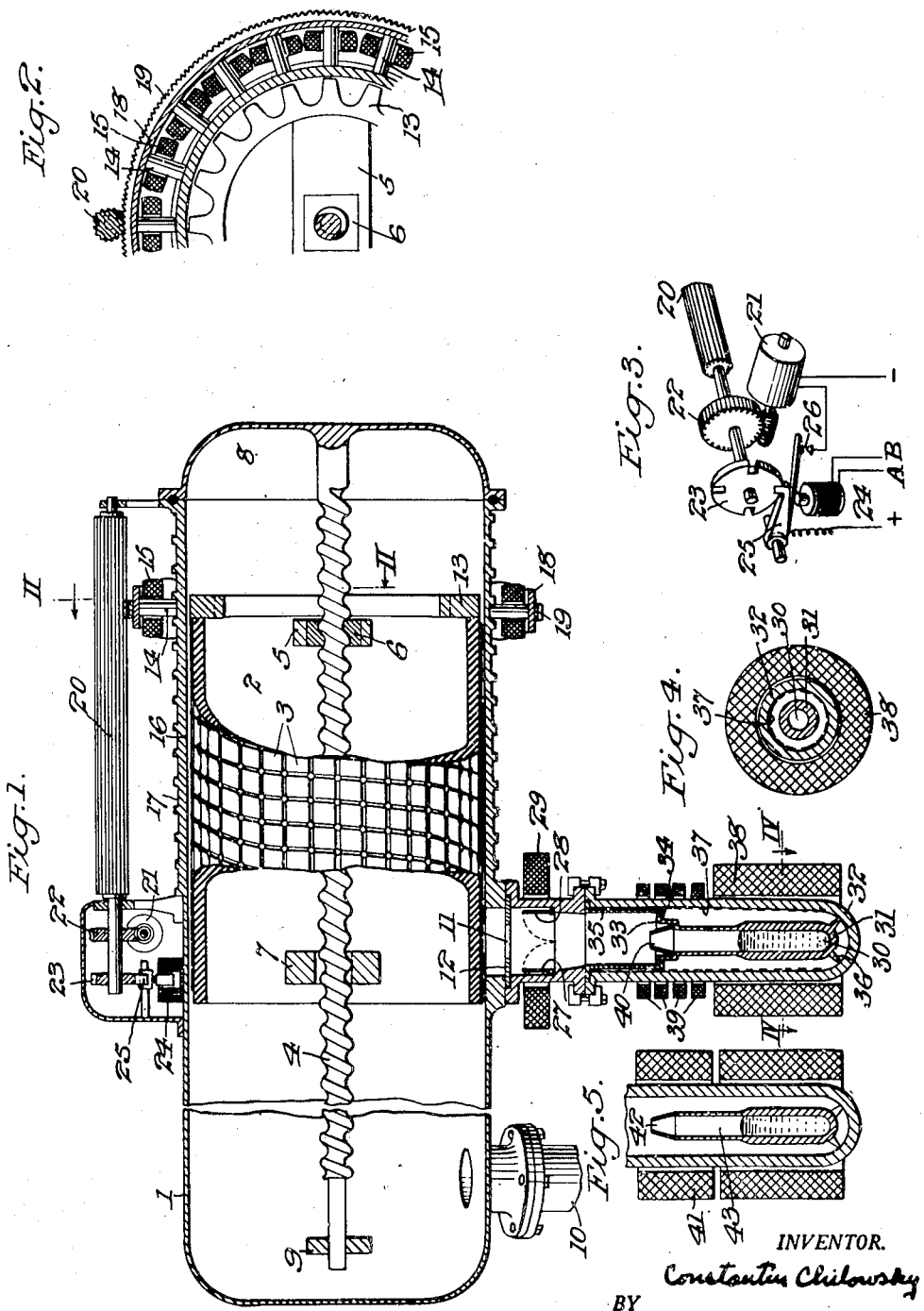
INVENTOR.
Constantin Chilowsky
BY
Brown + Seward
ATTORNEYS July 20, 1948. C. CHILOWSKY 2,445,310
MANUFACTURE OF PIEZOELECTRIC ELEMENTS
Filed Jan. 29, 1944 5 Sheets-Sheet 2
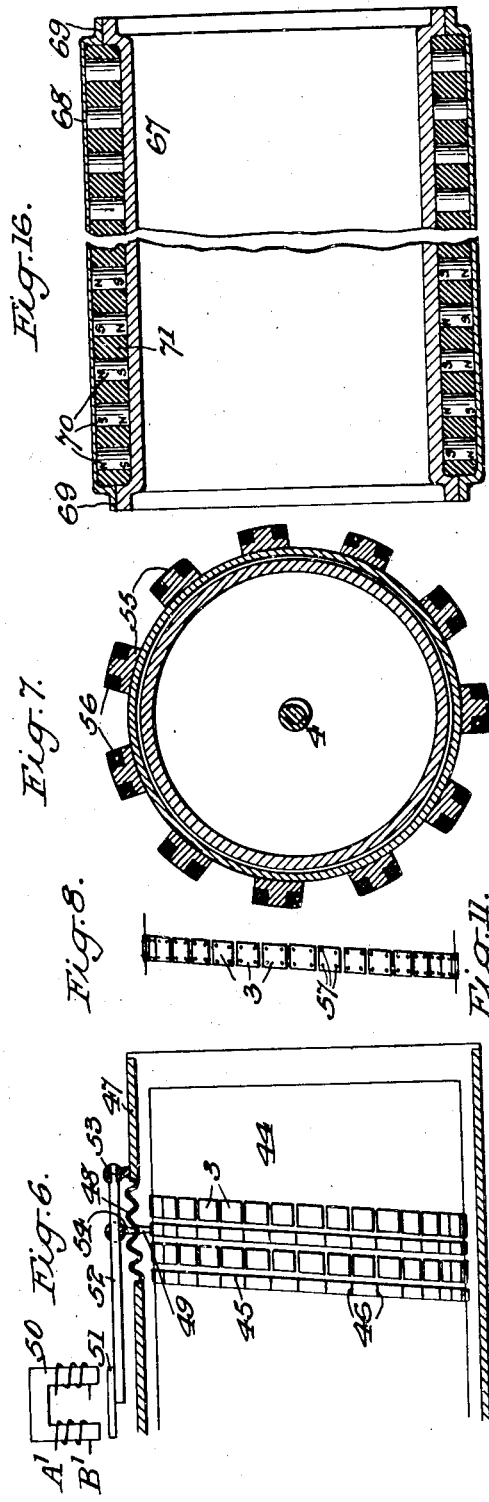
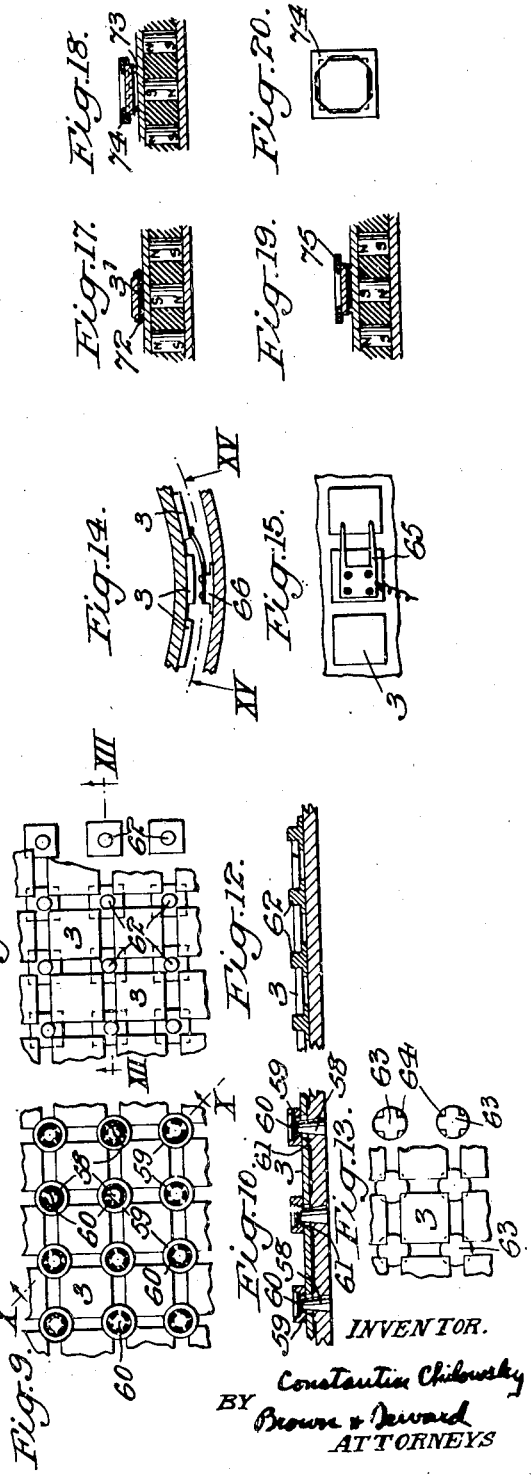

July 20, 1948.  C. CHILOWSKY  2,445,310
MANUFACTURE OF PIEZOELECTRIC ELEMENTS
Filed Jan. 29, 1944  5 Sheets-Sheet 3
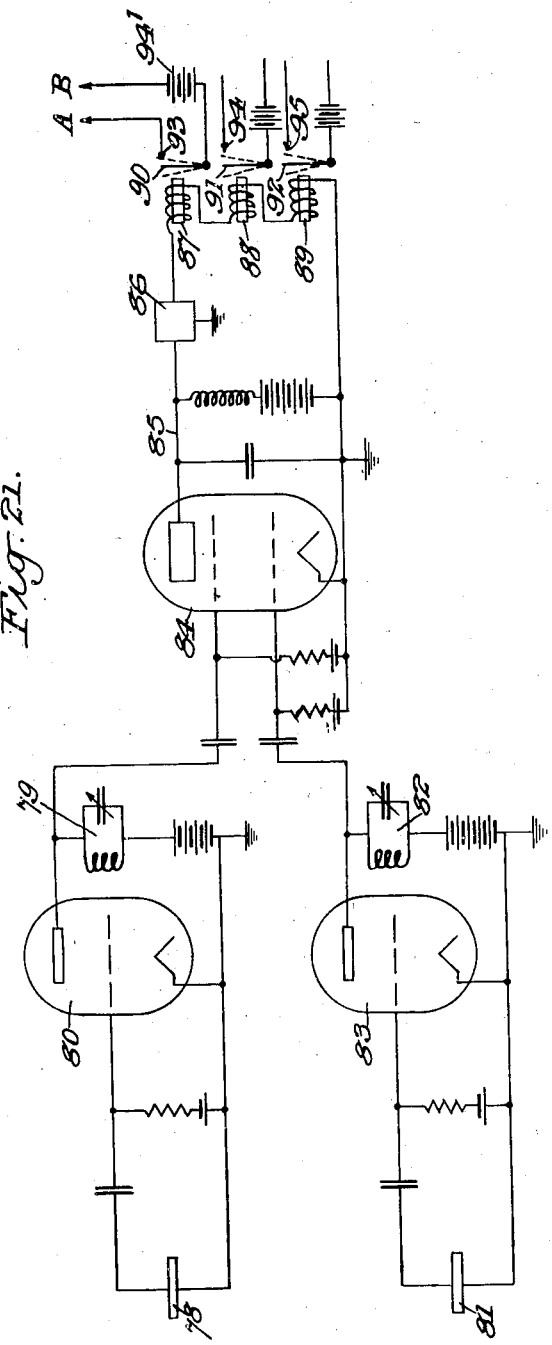
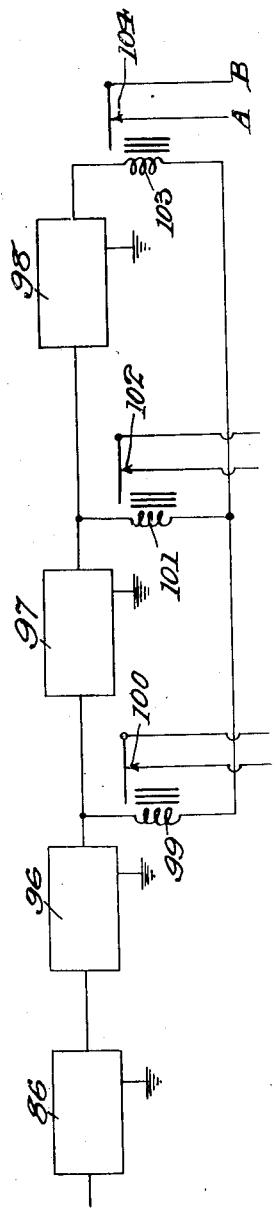
INVENTOR.
Constantin Chilowsky
BY Brown + Seward
ATTORNEYS July 20, 1948.   C. CHILOWSKY   2,445,310
MANUFACTURE OF PIEZOELECTRIC ELEMENTS
Filed Jan. 29, 1944   5 Sheets-Sheet 4
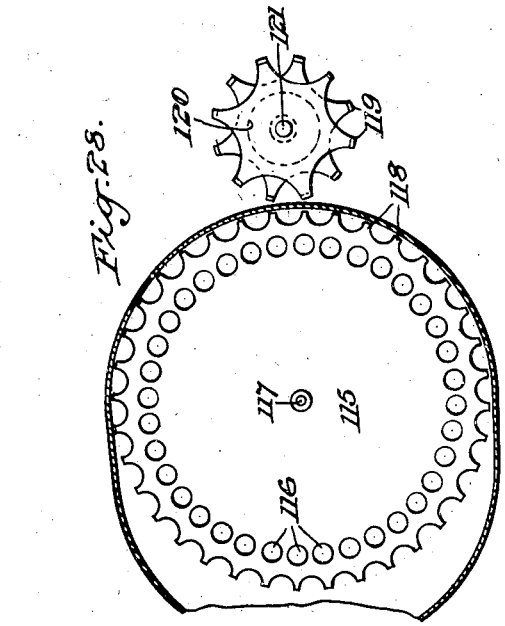
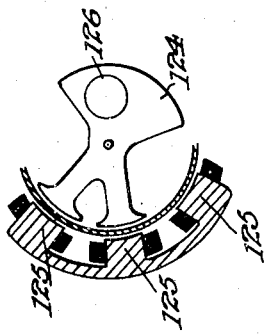
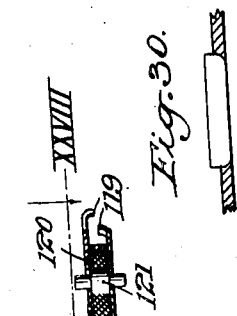
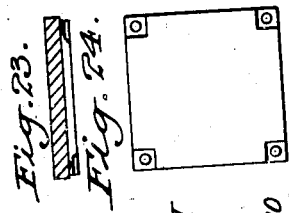
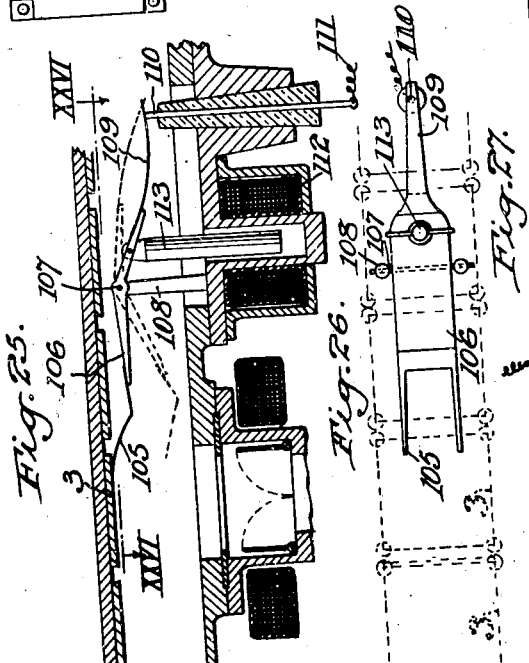
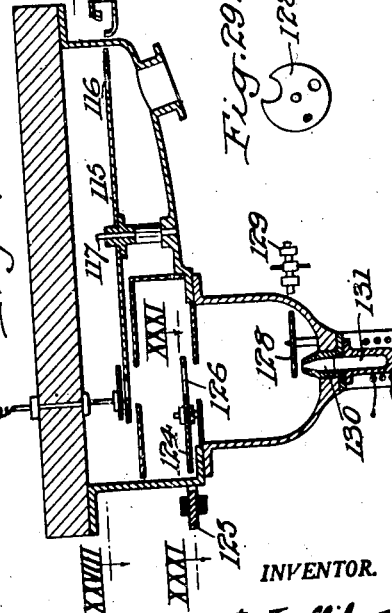
INVENTOR.
Constantin Chilowsky
BY
Brown & Seward
ATTORNEYS July 20, 1948.  C. CHILOWSKY  2,445,310
MANUFACTURE OF PIEZOELECTRIC ELEMENTS
Filed Jan. 29, 1944  5 Sheets-Sheet 5
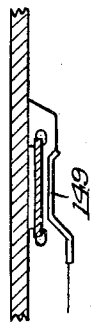
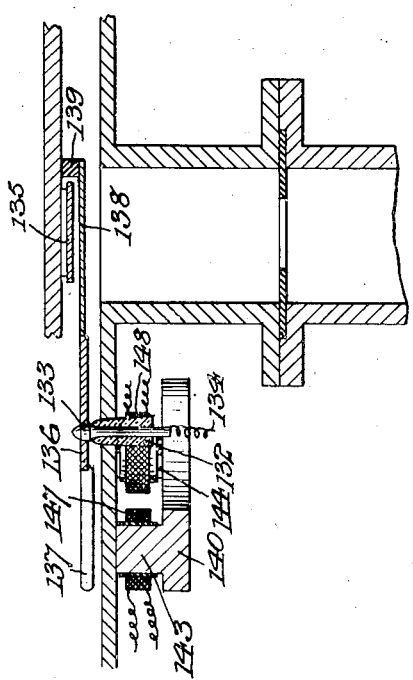
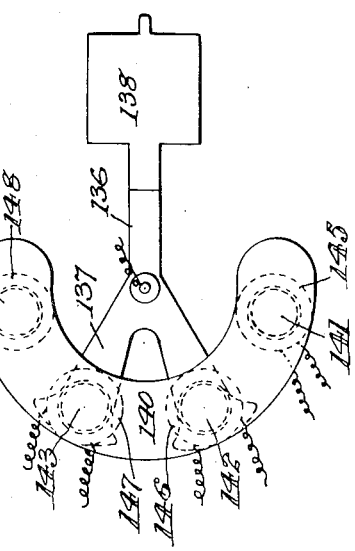
INVENTOR.
Constantin Chilowsky
BY
Brown + Seward
ATTORNEYS Patented July 20, 1948

2,445,310

UNITED STATES PATENT OFFICE 2,445,310

MANUFACTURE OF PIEZOELECTRIC ELEMENTS

Constantin Chilowsky, New York, N. Y.

Application January 29, 1944, Serial No. 520,275

1 Claim. (Cl. 171—327)

This invention relates to the manufacture of piezo-electric elements, and particularly to a method and apparatus for regulating and adjusting the natural frequency of piezo-electric stabilizers having mechanical resonance for high frequency electric circuits.

Stabilizers with mechanical resonance, and particularly piezo-electric quartz plates, which oscillate transversely through the direction of thickness require an extremely fine adjustment of their thickness. Usually the first approximate adjustment is relatively simple, consisting of a mechanical grinding treatment. The second adjustment is also usually performed with the aid of a grinding machine, but under periodic control by the operator for checking the natural frequency of the crystal plate. The final or third adjustment is the most delicate and precise, and is performed generally by manual grinding under constant control of the natural frequency or of the difference between the natural frequency and the required frequency. According to the present invention, it is proposed to substitute, at least for the second and third operations, an entirely different procedure which is much more rapid and which, if necessary, can be made entirely automatic.

According to this procedure, plates of piezo-electric quartz are finished by the first grinding operation to a thickness less than the required final thickness, and consequently for higher natural oscillations. The quartz laminations or plates are then built up to the required thickness by progressively depositing a layer of substance which firmly adheres to the surfaces of the laminations or plates and increases their thickness, while reducing their natural period of oscillation until the required value is reached. Such an adherent layer can be gradually deposited, for instance, by cathodic pulverization, but this invention provides particularly for a procedure of depositing metal by vaporization in a very high vacuum, this process being specially adapted and particularly advantageous for this particular purpose.

In carrying out this procedure, a quartz lamination or plate (for instance, after the first grinding operation) is placed in front of and at a certain distance from the material to be deposited, which latter is maintained by electric heating at a temperature sufficiently high for its vaporization, the entire assembly being contained in a hermetically sealed chamber in which high vacuum is maintained. Metallic or other vapors, in a molecular form, are projected thermally in straight paths from their source against the surfaces of the laminations at a high speed through the vacuum and add to the surfaces strongly adhering molecular layers. These layers are deposited gradually and uniformly at a rate which can be varied within wide limits by varying the temperature of the deposited material, i. e., of the source of vaporization.

The natural frequency of mechanical oscillations of the resonance of quartz plates varies gradually as a function of the thickness of the deposited layer, and it is proposed to place the plate in front of a source of vapor in an electric system which will start and maintain mechanical oscillations of the lamination during the depositing of the added material. Electric wires of the system pass to the outside of the plate and place it in a condition under which it will be possible to determine the natural frequency of the quartz. As soon as this frequency reaches the required value, the process of deposition of the material is stopped; this being accomplished, for instance, by removal of the quartz or by screening it from the source of vaporization so as to protect it from the vapors.

Various metals can be used to constitute the added material, such as aluminum, copper, silver, nickel, gold, platinum, chromium, etc., and the same process of vaporization in a vacuum can also be used with non-metallic substances. It is preferable to select such materials as will produce the least possible reflection of mechanical vibrations in their passage from the quartz into the deposited layer. For this purpose the material should be so selected that the product of its density $d_1$ and the velocity $v_1$ of propagation of sound in the material is as close as possible to the product of the density $d_0$ of quartz and the velocity $v_0$ of sound propagation therein. It is particularly desirable to use for the formation of added layers, aluminum whose product $d_1v_1$ is very close to the product $d_0v_0$, of quartz. Still better results may be obtained by using alloys of aluminum or copper (or other metals) or by using melted quartz. The latter has the advantage of still lower reflection, as well as a very small coefficient of damping of vibrations and a very low temperature coefficient so that its properties are affected very little by variation in temperature. On the other hand, layers of very dense metals such as gold or platinum (or other alloys) can be used for providing (in layers much thinner than the aluminum) not only adjustment of frequency but also complete stability against the action of external agencies. In this connection it may be noted that layers which are very thin in relation to the thickness of the quartz plate have very little effect on the damping of oscillations or on temperature variations.

Generally speaking, the thickness of the deposited layer is of the order of the accuracy with which the lamination is finished during the first mechanical grinding operation. According to the procedure of this invention, however, it is possible considerably to reduce the requirements for accuracy of this grinding operation, which is thereby simplified, with a corresponding increase in thickness of the deposited layers when necessary.

For industrial purposes it is proposed to treat simultaneously a more or less large number of quartz plates or laminations in a single operation. Simultaneous depositing of the material on a large number of quartz plates is possible but simultaneous control for a large number would be difficult, and it is therefore proposed that the plates should be treated successively in a single operation of the apparatus, the plates being placed successively in front of the incandescent source from which a jet of vapors is directed. At the same time the plate on which the vapors are being deposited is connected with wires which extend outside the apparatus and which are connected with instruments for continual measurement of the natural frequency of mechanical oscillations of the plate. The frequency measuring apparatus may comprise known devices such as an oscillator of mechanical resonance in a quartz plate of a constant natural period of frequency and preferably of the same frequency as that which is desired for the quartz plate being treated. The arrangement is preferably such that it will be possible at all times to compare beats between the two frequencies, one produced by the control plate outside the vacuum apparatus and the other (constantly changing with the deposit of additional material) by the quartz being treated.

Observation of these beats can be maintained by the operator, as by means of a telephone, or by a suitable apparatus for visibly indicating the beat frequency. It is particularly provided, however, that the control may be effected by an automatic apparatus which will stop the flow of the vapors to the surface of the quartz plate at the exact moment when the latter has been built up to a thickness such that the beats become zero or their predetermined value. Suppression of the flow or stream of vapor may be effected by the removal of one plate and substitution of another in front of the source of vapor; or if greater accuracy is required, the stream or jet of vapor may be stopped by closing automatically a shutter which remains closed only long enough to permit replacement of the treated plate by another one. Such instantaneous cutting off of the vapor stream ensures great precision.

Preferably a large number of quartz plates are introduced into the apparatus at the same time, the number depending on the size of the apparatus and being, for instance, several hundreds or even thousands of pieces. The speed of deposition is so regulated that the plates will have time to be treated successively, while each treatment will be sufficiently long to make possible the accurate regulation of the natural frequency of the quartz by stopping the deposition at exactly the right point.

In order to realize the last condition, the quantity of material projected on the plate per second should be relatively large at the beginning of each operation and gradually decreasing as the natural frequency of the plate approaches the required value, thereby making possible very accurate regulation of the time of stoppage of the deposition. Assuming that the intensity of the vapor source remains the same, this effect may be obtained by shielding the stream of vapor, the shielding varying as a function of the difference in beats between the two frequencies; the shielding increasing and the amount of material deposited being reduced with the approach to the required frequency. The shielding may be made continuous or step by step, as by the successive introduction of smaller and smaller diaphragms. Under such conditions of regulation, the average rapidity of deposition may be regulated in such a manner that the treatment can be completed in thirty to sixty seconds, for instance; although this time may be varied within wide limits according to particular requirements.

A sufficient amount of material should be provided at the source of vaporization for uninterrupted continuance of the operation which may require several hours. If desired, it may be possible to treat simultaneously several pieces of quartz, using the same source of vapor or different sources, and with different frequency measuring installations.

The process of deposition of vapors in vacuum affords considerable advantages over the process of deposition by cathodic pulverization, particularly in that the speed of deposition is much greater, thus permitting successive operation on a large number of quartz plates or crystals, there is better adhesion of the deposited layers, and it is possible to use aluminum which cannot be used in the cathodic method.

The herein described process affords considerable technical advantages, including:

1. Savings in time of the operation, since the natural frequency of the plate may be regulated and corrected in less than one minute.
2. Successive accurate operations on a large number of quartz plates in a single operation.
3. Automatic control of such successive operations.
4. Regulation and correction of thickness can be made with greater precision than with manual operation, which is especially important for extremely high frequency.
5. Quartz plates which have already been mounted for use may be treated in the vacuum chamber, so that subsequent correction of the frequency is not necessary.

A practical embodiment of the invention is shown in the accompanying drawings in which:

Fig. 1 represents a vertical median section of the vacuum chamber and associated parts, parts being broken away.

Fig. 2 represents a partial transverse section taken along the line II—II of Fig. 1, looking in the direction of the arrows.

Fig. 3 represents a detail elevation of the intermittent driving mechanism shown in Fig. 1.

Fig. 4 represents a horizontal section taken along the line IV—IV of Fig. 1, looking in the direction of the arrows.

Fig. 5 represents a detail vertical section of a modified form of vaporizer.

Fig. 6 represents, in vertical section, parts being broken away, of a modified arrangement of the intermittent drive.

Fig. 7 represents a section through the cylinder and vacuum chamber, in a plan perpendicular to the axis of the cylinder, showing a modified form of driving means for the cylinder.

Fig. 8 represents a detail elevation of a part of the cylinder, showing a particular means for mounting quartz plates thereon.

Fig. 9 represents, in plan view, a modified means for mounting crystal plates on the cylinder.

Fig. 10 represents a section taken along the line X—X of Fig. 9, looking in the direction of the arrows.

Fig. 11 represents, in plan view, another modified means for mounting crystal plates on the cylinder.

Fig. 12 represents a section taken along the line XII—XII of Fig. 11, looking in the direction of the arrows.

Fig. 13 represents a plan view of a modified form of the attaching means shown in Figs. 11 and 12.

Fig 14 represents a detail section in a plane perpendicular to the axis of the cylinder, showing a form of contactor.

Fig. 15 represents a section taken along the line XV—XV of Fig. 14, looking in the direction of the arrows.

Fig. 16 represents a longitudinal section through a modified form of cylinder, parts being broken away.

Figs. 17, 18 and 19 represent, in section, modified means for mounting plates on the cylinder shown in Fig. 16; Fig. 20 representing a top plan view of the holding means shown in Fig. 19.

Fig. 21 is a wiring diagram representing the circuits which may be used for precise automatic control of the deposition of metal on the plates being treated.

Fig. 22 is a wiring diagram representing a modified circuit arrangement.

Fig. 23 represents a vertical section through a quartz plate showing a modified arrangement for mounting it on a support on the cylinder; Fig. 24 representing a plan view of said support.

Fig. 25 represents a detail vertical section showing the arrangement of a pivoted contactor and adjacent parts.

Fig. 26 represents a section taken along the line XXVI—XXVI of Fig. 25, looking in the direction of the arrows.

Fig. 27 represents a vertical section through a modified form of apparatus in which the plates are mounted on a disk instead of on a cylinder.

Fig. 28 represents a horizontal section taken along the line XXVIII—XXVIII of Fig. 27, looking in the direction of the arrows.

Fig. 29 represents a detail top plan view of the diaphragm shown in Fig. 27; Fig. 30 representing a detail section showing the manner in which plates may be mounted in the disk shown in Figs. 27 and 28.

Fig. 31 represents a detail horizontal section of the shutter shown in Fig. 27, taken along the line XXXI—XXXI of said Fig. 27.

Fig. 32 represents a detail vertical section showing means for ascertaining the accuracy of the natural frequency of a crystal plate.

Fig. 33 represents a bottom plan view of the device shown in Fig. 32, parts of the vacuum chamber being removed; and Fig. 34 represents a detail vertical section of a modified form of the element shown in Figs. 32 and 33.

Referring to the drawings, and particularly Fig. 1 thereof, there is shown a high vacuum chamber 1 containing a hollow metallic cylinder 2 adapted to support on its outer surface a multiplicity of quartz plates 3, which plates may preferably be arranged spirally around the cylinder. The chamber 1 is traversed by a shaft 4 provided with threads of large pitch, which shaft serves as the axis of rotation and axial displacement of the cylinder 2. It will be understood that the axial displacement of the cylinder should correspond to the spiral arrangement of the plates on the surface thereof. The cylinder 2 is mounted by means of a cross bar 5 on a nut 6 which engages with the threads on the shaft 4, the cylinder being guided axially by means of the nut 6 and a bushing 7 which is of a size sufficient to extend over at least two threads of the screw and which is connected to the cylinder by means of a cross bar similar to the bar 5. The screw 4 is shown as being rigidly mounted on the cover 8 of the vacuum chamber and having its inner end supported by a bracket 9 projecting inwardly from the body of said chamber.

Since it is desirable that complicated operating mechanisms should not be permanently located within the vacuum chamber, the screw 4 and its associated parts are preferably simple in form and readily removable for cleaning or repair. The screw 4 may be made of glass so that it may more readily be kept clean. The cover 8 is fitted to the body of the vacuum chamber with a tightly sealed joint, and the connection to a vacuum pump is indicated at 10.

The vacuum chamber is provided with a window 11 in the diaphragm 12 communicating with a source of metallic vapor and the quartz plates 3, spirally mounted on the cylinder 2, are successively brought in position in front of the window 11 by the rotation and axial movement of said cylinder. The cylinder is driven magnetically by means of the gear ring 13 (composed of magnetic material such as soft iron) which ring is fixed to one end of the cylinder 2. The projecting teeth of said ring 13 are magnetically engaged by a system of magnets having cores 14 and windings 15, which magnets form a complete or partial spiral ring around the outside of the portion 16 of the wall of the chamber. This portion 16 is provided with spiral tracks 17 having the same pitch as the threads of the screw 4. The magnets 14, 15 are supported in a ring 18 having gear teeth 19 around its periphery; the teeth 19 engaging the teeth of a wide gear 20, by which the magnet ring assembly may be rotated and advanced along the spiral track 17. During such rotation the magnets, by their attraction for the projecting parts of the ring 13, will move said ring and the cylinder 2 around and along the screw 4 simultaneously at the same rate.

The parts just described are driven intermittently by means of a motor 21 connected by worm gearing 22 with the shaft of the wide gear 20. On the same shaft is mounted a disk 23 having regularly spaced slots in its periphery, the slots being so disposed that rotation between two consecutive slots corresponds to the rotation of the cylinder which is needed to move a quartz plate from its position opposite the window 11 and to move the next following quartz plate into such position. A magnet 24 operates a pawl 25 which engages with the slots in the disk 23 for locating the parts in stationary position and which may be disengaged to permit rotation of the cylinder. These parts are shown in detail in Fig. 3, which shows also the contacts 26 for energizing the motor 21 when the pawl is moved to releasing position in order to permit the disk 23 to be rotated until the pawl engages the next slot. The magnet 24 is provided with electrical connections A, B which may be connected to a source of electric current through a manual or automatic switching arrangement. In the case of automatic operation, the contacts A, B are connected with the final relay of a system in which the circuit is closed automatically when the quartz plate in front of the window 11 has reached the desired thickness corresponding to a desired frequency. At that moment the relay will send to the magnet 24 a short impulse of current sufficient to free the pawl 25 from the disk 23 and to cause the motor 21 to be operated by closing the contacts 26; the impulse being sufficiently brief so that the pawl will fall into engagement with the next slot under the urging of a spring, not shown.

When the accuracy required in the final product is not too great, it can be attained merely by moving the quartz plates successively into and out of a continuous jet of metal vapor. In order to achieve more accurate results, however, it is desirable to control the jet of vapor by means of shutters which can be operated to turn the jet off or on in a small fraction of a second. Such shutters are shown at 27, 28 in Fig. 1, the shutters being of magnetic material, mounted on hinges and arranged to be normally closed, as by the action of gravity. The shutters 27, 28 are in the field of a coil 29 and may be opened instantly upon the passage of current through said coil. By means of suitable wiring, not shown, the current through the coil 29 may be interrupted to close the shutters during the time that the pawl 25 is out of engagement with the slots in the disk 23 and while the motor 21 is acting to move a treated plate out of its position before the window 11 and to move another plate into position for treatment; the coil 29 being arranged to receive current and open the shutters as soon as the new plate is in position.

The vaporizer for the metal to be deposited (aluminum, for instance) is shown at the bottom of Fig. 1 wherein the metal 30 is contained in a crucible 31 (of tungsten, molybdenum, carbon or graphite), the metal 30 being sufficient in quantity for the treatment of all the quartz plates on the cylinder 2. The crucible 31 is contained within a fused quartz tube 32 having flanges at its top for tight engagement with the vapor inlet passage of the vacuum chamber. The crucible 31 is preferably formed with the upper portion of its walls reduced in thickness, and is provided at its top with outwardly projecting hooks or flanges 33 for engagement with the inwardly projecting flange 34 of a tube 35 supported from the top of the tube 32. The crucible 31 may also be provided with projections 36 for insuring proper centering of the crucible in the tube 32. The supporting tube 35 should be readily removable for cleaning or replacement, since it is intended to collect on its surface any excess of metal vapor resulting from the expansion of the jet; such cleaning being effected by washing in nitric acid, for instance, for dissolving the deposited aluminum. The inner surface of the tube 32 should be silvered as shown at 37 in order to form a mirror facing the crucible, so that thermal radiation from the latter will be reflected and the tube 32 will not become overheated. The mirror 37 is preferably cut into separate surface areas so that it will not be appreciably heated by induction within itself. The high vacuum maintained within the apparatus, including the vaporizer, insures a minimum of heat loss by convection. The metal 30 is heated by induction upon the passage of high frequency currents through the coil 38.

A plurality of coils 39 may be provided around the upper part of the crucible 31, these coils being supplied with high frequency currents which are progressively shifted in phase from top to bottom so as to form a sort of rotating field which will act on the metal as an electrodynamic force directed from the top to the bottom. This force will tend to drive back into the mass 30 of the metal any vapors which may have condensed on the upper walls of the crucible. The size of the vapor jet may be regulated by means of the removable metal cone 40 (of tungsten, for instance) which is located within the field of the coils 39. The provision of said coils is particularly useful when there is danger of an accumulation of deposited metal vapor partially closing the opening of the cone 40.

In the modification shown in Fig. 5, the coils 39 are replaced by a single coil 41, so positioned in relation to the cone 42 and the crucible 43 that the latter are in an alternating magnetic field which decreases toward the lower part of the device. When the coil 41 is supplied with current at a suitable frequency an electrodynamic force will be created, acting in a downward direction on any metal which may have been deposited on the inner walls of the cone 42 and the crucible 43.

In the modified form of the cylinder and vacuum chamber shown in Fig. 6, the successive positions of the cylinder may be regulated with great precision. In this case the cylinder 44 (supported as previously described) is provided with a spiral rib 45 having transverse grooves 46 at regular intervals along its length, said grooves being spaced a distance equal to the distance from center to center of successive quartz plates 3. The quartz plates are arranged spirally around the cylinder in the space between successive turns of the spiral rib 45. In the wall of the vacuum chamber 47 is fitted a flexible membrane 48 having a finger 49 projecting inwardly from its center and adapted to engage intermittently with successive grooves 46 in order to stop the rotation of the cylinder. The finger 49 may be moved out of engagement with a groove, to permit rotation of the cylinder, by means of the electromagnet 50 acting on the end 51 of a lever 52 which is hinged to the outside of the chamber at 53 and is connected to the outside of the membrane at 54. A short current impulse on the magnet 50 (through the leads A', B') may be simultaneous with the current supplied to the magnet 24 (Figs. 1 and 3) so that the cylinder will be released for rotation at the moment when sufficient metal has been deposited on the plate being treated. While the disk 23 and pawl 25 may serve to stop the cylinder in a reasonably accurate position, it will be evident that the arrangement shown in Fig. 6 insures a much more precise location of the plates in the desired position.

In Fig. 7 is shown a modified driving means for rotating the cylinder, in which the cylinder is entrained by the rotary field of a number of magnets 55 and their coils 56 which are placed circumferentially around the vacuum chamber. The cylinder may be rotated by providing the magnets with a relatively short impulse of alternating current at the moment when the treatment of a plate has been completed and a new plate is to be brought into position. This method of driving the cylinder may desirably be combined with the stopping arrangement shown in Fig. 6.

The quartz plates may be attached to their supporting cylinder in a variety of ways. As shown in Fig. 8, the plates 3 are secured by means of a suitable glue or other adhesive to the ends of a series of small projections 57 which are placed in groups of four so as to support the plates at their four corners and at a height sufficient to keep the plates from coming in contact with the cylinder.

As shown in Figs. 9 and 10, the cylinder is provided with a series of small permanent magnets 58, the cylinder itself being preferably made of magnetic material. A small cap 59 of insulating material such as porcelain is provided with an iron insert 60 and is adapted to fit loosely over the upper end of the magnet 58. The surface of the cylinder is formed with raised ribs 61 around each of said magnets in order to support the four corners of the plates 3; the plates being held in position by means of the caps 59 due to the attraction of the magnets for the iron inserts 60 in said caps. Figs. 11 and 12 show a modified form of magnets 62 in which the supporting ribs constitute part of said magnets; the caps being removed in these figures. A more precise positioning of the quartz plates may be insured by the arrangement shown in Fig. 13, in which the magnets 63 are cut out at 64 to provide recesses for receiving the corners of the plates.

Figs. 14 and 15 show a form of contact finger 65 mounted on an insulating support 66 inside the vacuum chamber in a position such that it will make an electric contact with the metal deposited on each quartz plate as it is being treated. The contact finger 65 is suitably connected with a source of high frequency current in order that the natural frequency of the plate may be determined during its treatment.

The modified form of cylinder shown in Fig. 16 comprises concentric cylindrical walls 67 and 68, hermetically welded or soldered together around their ends 69. The inner wall 67 is preferably of a magnetic material such as iron or steel, while the outer wall 68 is of a non-magnetic material such as stainless steel, the inner wall being substantially thicker than the outer wall. In the cylindrical space between said walls is mounted a number of permanent magnets 70 having their magnetic poles disposed radially of the cylinder, the polarity of every other magnet being reversed as indicated in the drawing, and the magnets being disposed at intervals corresponding to the points on the cylinder where quartz plates are to be mounted. The magnets may be held in their proper positions by a filling 71 of a solidified plastic material. The use of such a system of magnets has the advantages of providing a relatively smooth surface on the cylinder so that it can readily be kept clean, and the external magnetic field can be made as strong as desired, for instance, by reducing the inner diameter of the wall 67. The plates may be mounted on the cylinder shown in Fig. 16 by such means as are shown in detail in Figs. 17 to 20. In Fig. 17 the plate 3' is slightly beveled and is held in a steel tray 72, the edges of which are arranged to clamp the beveled edges of the plate. The beveled edges may be replaced by narrow fingers, in which case the plate need only be beveled at points corresponding to the position of said fingers, as at the four corners of the plate. The cylindrical wall 68 may be provided with spiral projections serving as a guide in the positioning of the trays 72, which can be made of sizes and shapes to fit various sizes and shapes of quartz plates. In Fig. 18, the wall 68 is provided with projections 73 on which the plate is supported and to which it is held by the magnetic attraction of a steel frame 74 which surrounds the plate and engages its corners as shown in Fig. 20. A simpler form of frame is shown at 75 in Fig. 19, this frame having the same appearance in plan view as the frame 74 shown in Fig. 20. The frames 74 and 75 may have current applied to them for testing the frequency of the plate as previously described.

Automatic regulation and control of the natural frequency of the quartz plates during their treatment may be effected by the provision of a heterodyne hook-up in which there are two oscillating circuits, one controlled by a standard quartz crystal and the other controlled by the quartz plate being treated. This produces an alternating current the frequency of which represents the difference between the frequencies of the two pieces of quartz, i. e., a beat frequency. It is possible, for instance, to apply to two control grids of a mixing radio tube, the two oscillating currents controlled respectively by the two pieces of quartz; a filter of low frequencies (below 1000, for instance) at the exit from the mixing tube will pass only the beat frequencies. The current thus produced may be used for operating a series of relays tuned to frequencies of 100, 10 and 1, for instance, or for operating a series of non-selective relays which are connected through low frequency filters with limits of the same three frequencies. Such relays, operating successively, can first reduce the rapidity of deposition of metal on the plate being treated, and then stop such deposition entirely when the proper frequency has been reached. A low frequency amplifier may desirably be used between the mixing tube and the relays.

The wiring diagram of Fig. 21 illustrates the foregoing arrangement, in which the quartz plate being treated is shown at 78, connected in the oscillating circuit 79 having the tube 80. The standard or control crystal 81 is connected in a similar circuit 82 having the tube 83. The frequencies derived from the circuits 79 and 82 are applied to the grids of the mixing tube 84 in the circuit 85. The beat frequencies thus produced in the circuit 85 are amplified by the low frequency amplifier 86 and are passed to the relays 87, 88, 89 having mechanical resonance, their respective vibrating blades 90, 91, 92 being arranged to resonate at frequencies of, for instance, 1, 10 and 100 respectively.

In ordinary cases when very great precision may not be required, it may suffice to operate only the single relay 87 having the blade 90. This blade will close the contact 93 so as to send current impulses from the battery 94' to the terminals A, B of the magnet 24 (Fig. 3), thus controlling the stopping of deposition of metal on the plate being treated and permitting movement of the cylinder to bring a new plate into position for treatment. When greater precision is required, the relays 87, 88, 89 may be operated, the relay 89 operating its blade 92 at a frequency of 100 in order to close the contacts 95 in the circuit of an electro-magnetic device which places a smaller diaphragm in front of the window of the vaporizer. In a similar manner, the relay 88 will respond to a frequency of 10 to close the contact 91 in order to place a still smaller diaphragm in position, so that metal is deposited more slowly on the plate as its frequency approaches the desired value; when this value is reached the relay 87, responsive to the beat frequency of 1 will stop the deposition and move a new plate before the window as previously described.

In the modified arrangement shown in Fig. 22 the resonant relays 87, 88, 89 are replaced by low frequency filters 96, 97, 98, the filter 97 being adapted to pass frequencies of the order of 100 cycles per second and being associated with the high resistance relay 99. This relay is adapted to close the contact 100 in a secondary circuit which operates an electro-magnetic device for reducing the size of the diaphragm as explained in connection with the relay 89 of Fig. 21. The filter 97 may pass only frequencies below 10 and thus operate the relay 101 to close the contact 102 for further reducing the size of the diaphragm, as in the case of the relay 88. The filter 98 may pass only frequencies below one cycle in order to operate the relay 103 to close the contact 104 in the circuit of the terminals A, B, thus stopping the jet of vapor and moving a new plate into position for treatment.

Special care must be taken in establishing electric contact with the metal layer depositied on the quartz plates, in order to avoid short circuiting of the testing and control circuits. Thus it is important that the deposited layer be prevented from coming in contact with any grounded part of the plate support, as noted in connection with Figs. 9 to 13 and 16 to 20. A preferred arrangement for obtaining electric contact with the deposited metal while it is being deposited includes the provision of a movable contact which may be caused to touch the deposited metal after the treatment has started. The contact finger shown in Figs. 14 and 15 may be used to establish contact with the deposited metal by providing for a slight rocking motion of the cylinder in each of its fixed positions. In such a case the metal may be deposited first on parts of the plate which are not touched by the contact finger 65, and the cylinder then rocked slightly to bring the deposited metal in contact with said fingers while the depositing of the metal is continued and completed. Such rocking motion could be provided for in the structure shown in Fig. 6, for instance, by making the grooves 46 slightly wider than the end of the finger 49 which engages them.

An alternative form of contact is shown in Figs. 25 and 26 in which a contact finger 105 is mounted on a lever 106 which is pivoted at 107 on a support 108. A resilient contact 109 is mounted on the opposite end of the lever 106 in such a manner that it will bear against the end of an electrode 110 which is mounted in and insulated from the wall of the vacuum chamber; the electrode 110 being connected to an external lead wire 111. The contact between 109 and 110 is made when the lever 106 is rocked to bring the contact finger 105 against the layer of metal deposited on a plate 3, the lever being moved to this position by the action of the coil 112 on the iron core 113. The finger 105 may be moved out of contact with the deposited metal by the spring action of the resilient contact 109 when current through the coil 112 is interrupted, or a separate spring may be provided for this purpose.

A modified form of vacuum chamber is shown in Figs. 27 and 28, in which the quartz plates are placed in a circle near the periphery of a disk 115 provided with openings 116. The openings may be beveled to fit correspondingly-shaped plates as shown in Fig. 30. The disk is arranged for rotation on its axis 117 and may be driven by the magnetic engagement between teeth 118 on the periphery of the disk and the teeth 119 of a magnetic device which, in turn, is driven intermittently by a motor or the like, not shown. The latter device includes a coil 120 surrounding a core 121, and the teeth 119 are arranged as shown in Figs. 27 and 28 so that adjacent teeth alternate in polarity according to their connection with the top or bottom of the core 121.

A rotary shutter 124 is arranged for magnetic control through the wall of the vacuum chamber by means of the three interconnected magnets 125, the position of the shutter being determined by the distribution of current in the windings of said magnets. The shutter is provided with an opening 126 to permit passage of vaporized metal when the opening is in register with the jet of such vapor. The apparatus shown in Fig. 27 includes also a disk 128 having diaphragm openings of various sizes, as shown in the detail view, Fig. 29. The disk may be controlled by a magnetic or electromagnetic mechanism 129 similar to either of the mechanisms shown in Fig. 28 or 31, in order to place openings of different sizes in front of the cone 130 of the vaporizer 131. In normal operation the disk 128 will be placed first with its largest opening in front of the cone; when a predetermined thickness of metal has been deposited on the plate being treated the disk will be rotated, as by means of current from the contact 95 (Fig. 21) to place a smaller opening in register with the cone, and the same action will be repeated by currents from the contacts 94 and 93 to effect further reduction and stoppage of the flow of vapor as the thickness of the deposited metal approaches and reaches its final value. The stoppage of the flow of vapor may be effected either by means of the disk 128 or by the shutter 124, as explained above.

It will be understood that the cylinder or disk shown and described herein may be moved mechanically instead of magnetically, such mechanical means comprising, for instance, springs which may be wound up at the start of the operation and which are arranged to drive the parts until the operation is completed. It will also be understood that the quartz plates need not be placed on the surface of a cylinder or disk but could instead be fed one at a time from a suitable stack or magazine, magnetically operated from outside the vacuum chamber. Mechanical operation of any internal parts may also be effected from the outside by transmitting power through a sealed connection such, for instance, as that shown in Fig. 6.

The material deposited on the quartz plates has been described as a vaporized metal, but it is also possible to deposit non-metallic substances and particularly fused quartz. Such a deposit may be made by vaporization in a high vacuum, the crucible being filled with quartz and vaporized at a higher temperature than aluminum. The use of a quartz deposit is advantageous because of the similarity between the deposited layer and the plate; the layer has the same absolute resistance to external agents, has the same thermal coefficient (approaching zero), and has the product $d_1v_1$ sufficiently similar to the product $d_0v_0$ of the piezo-electric quartz so that there is little reflection. In cases where these properties are not strictly required a similar deposit of oxides such as those used in certain glass compositions may be used.

Observation and control of the thickness of the deposit may be obtained by periodically (at short intervals) placing near the outer surface of the quartz plate a metal plate connected with an external electric circuit which will maintain the quartz under treatment in a state of oscillation. While the metal plate is being applied it forms both a capacity and a screen to temporarily stop the deposit of vaporized material. The duration of such periods of measurement of the natural frequency can be reduced to a minimum compatible with the inertia of the relays shown in Fig. 21, and the total duration of such periods may be made negligible in comparison to the total time of deposition.

An arrangement for effecting the control just referred to is shown in Figs. 32 and 33, wherein an insulating support 132 is mounted on the wall of the vacuum chamber to support the axis 133 which is electrically connected by the wire 134 with an external circuit for excitation of the quartz plate 135. A plate 136 is pivotally mounted on the axis 134 and is provided with arms 137 of magnetic material. The plate 136 also supports a capacity 138 which may have a shape similar to that of the quartz plate but be of larger size and may be made of a non-magnetic material. The capacity 138 may be provided with an insulating finger 139 to prevent electrical contact with the cylinder or disk on which the plates are mounted, and the capacity may, if desired, have its face covered with a thin layer of insulation. On the outside of the wall of the vacuum chamber is mounted a system of magnets having a common armature 140 of soft iron with four cores 141, 142, 143, 144 having their respective coils 145, 146, 147, 148. These coils are connected to a rotary contactor, not shown, which successively energizes pairs of cores as follows: First, 141 and 142, forming a magnet which retains the arms 137 in their extreme position opposite these cores; then cores 142 and 143, holding the arms 137 in the intermediate position shown in the drawing; and next, the cores 143 and 144, holding the arms 137 in their opposite extreme position. The pivoted parts 136, 137, 138 are thus reciprocated into and out of the position shown in the drawing, the contactor being so operated that the capacity remains in front of the quartz plate only for a very short time, sufficient to observe the frequency of the plate. At other times the capacity remains in its extreme positions in which it does not stop the passage of the jet of vapor. A uniform deposit of material is assured by the symmetrical arrangement resulting from the use of the four magnetic cores described, and the insulating finger 139 assures proper space between the capacity and the quartz plate.

If the quartz plate is so mounted that there are projections at its edges or corners (as in Figs. 18 and 19) the capacity may be shaped as shown in Fig. 34 so that the part 149, which is slightly smaller than the quartz plate, may be brought close to the surface of the plate while avoiding the projecting parts of the mounting. It would also be possible to obtain similar results by the use of a hinged capacity and shutter moved into and out of position adjacent the quartz plate by magnetic means.

It will be understood that various changes may be made in the form, construction and arrangement of the several parts without departing from the spirit and scope of my invention and hence I do not intend to be limited to the details herein shown and described except as they may be included in the claim.

What I claim is:

The method of forming a piezo-electric element having a desired thickness and natural frequency of resonance which includes, providing a plate of piezo-electric quartz having less than the desired thickness, gradually depositing by vaporization in vacuum an adherent layer of quartz on a surface of said plate, and stopping said deposit when the thickness and natural frequency of the combined plate and deposited quartz have reached the desired value.

CONSTANTIN CHILOWSKY.

REFERENCES CITED

The following references are of record in the file of this patent:

UNITED STATES PATENTS

| Number | Name | Date |
|---|---|---|
| 1,649,828 | Hund | Mar. 8, 1932 |
| 1,848,630 | Hulbert | Mar. 8, 1932 |
| 2,123,227 | Bieling | July 12, 1938 |
| 2,273,941 | Dorn | Feb. 24, 1942 |

FOREIGN PATENTS

| Number | Country | Date |
|---|---|---|
| 445,046 | Germany | May 30, 1927 |